INVENTOR
OTTO FUCHS

United States Patent Office 3,681,270
Patented Aug. 1, 1972

3,681,270
PROCESS FOR THE MANUFACTURE OF FOAM MATERIALS CONTAINING PLASTICIZER FROM POLYVINYLCHLORIDE AND COPOLYMERS THEREOF
Otto Fuchs, Oberlar, Germany, assignor to Dynamit Nobel A.G., Troisdorf, Germany
Filed May 22, 1970, Ser. No. 39,815
Int. Cl. C08f 47/10, 29/18, 45/38
U.S. Cl. 260—2.5 P
6 Claims

ABSTRACT OF THE DISCLOSURE

Process for the preparation of foam materials of vinylchloride copolymers having a K value of about 65 to 82 by treating a plastisol of this copolymer with a gas which is a carbon dioxide-air or a carbon dioxide-nitrogen mixture at a temperature of between 0 and 30° C., and preferably between 10 and 25° C., and at a pressure of about 80 to 120, preferably 90 to 110, atmospheres by expanding the pressurized gas-plastisol to atmospheric pressure, setting the thus formed foam material, and recycling excess gas after foaming.

Figure 1:
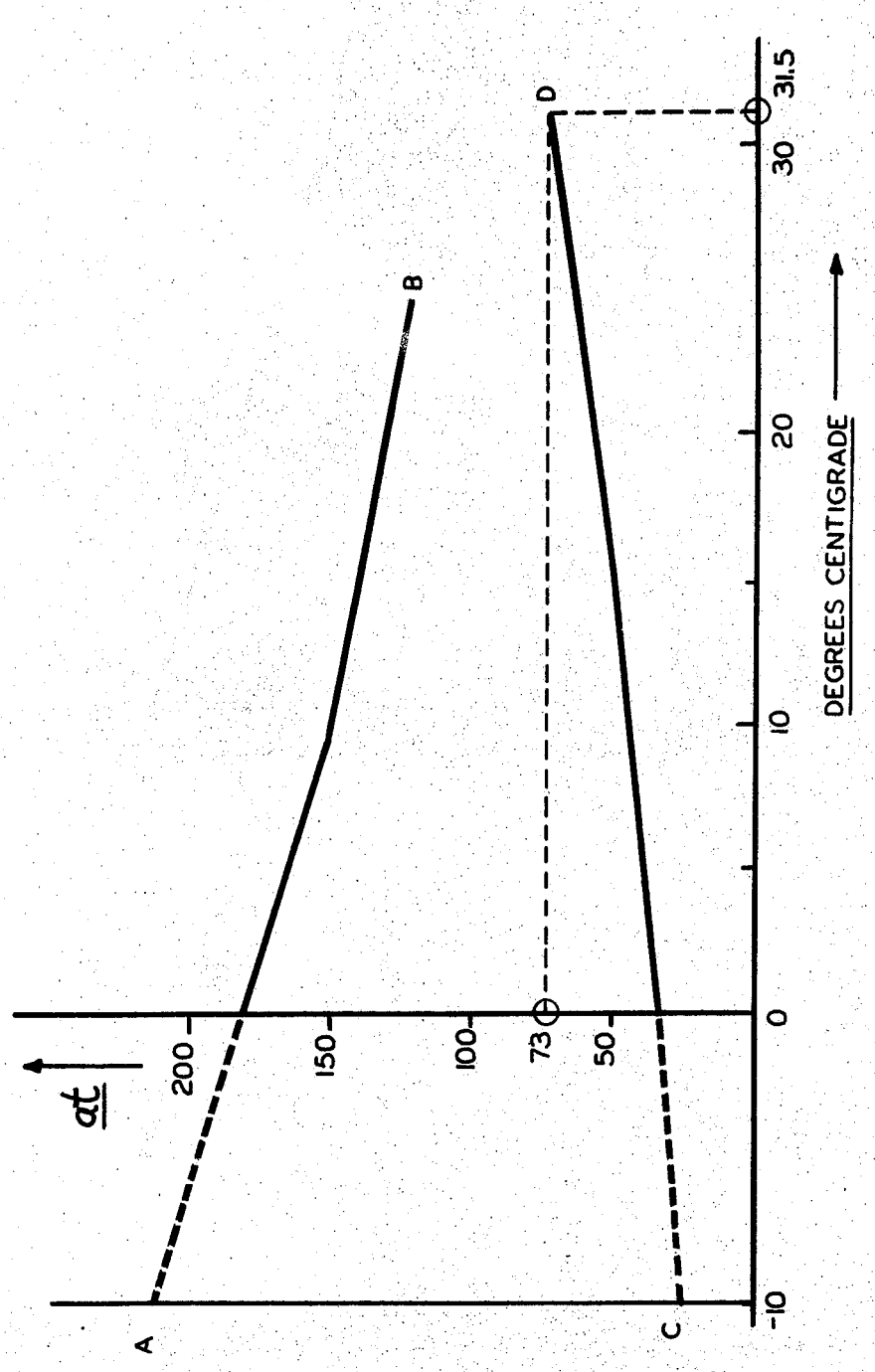

This invention relates to an improved process of preparing foamed polymeric vinylchloride materials.

Processes for manufacturing foamed polyvinyl chloride materials have been in use to some extent for many years.

One process that has long been known for the manufacture of foamed materials of polyvinylchloride is the so-called "gassing process" in which a paste composed of polyvinylchloride and a plasticizer is mixed with a blowing agent under pressure, the mixture foamed by pressure release, and the foam that is formed thereafter solidified. This process has been modified in many ways with respect to the gas used and with respect to the pressures applied in saturating the polyvinylchloride plastisol with gas.

For example, pure carbon dioxide is used in a number of such known processes. In the process of U.S. Pat. 2,763,475, pressures of about 0.7 to 7 atmospheres gauge and temperatures of about 20° C. are employed in the injection of the gas. Pressures higher than 7 atmospheres gauge are used to introduce the carbon dioxide gas into the paste according to the process described in U.S. Pat. 2,666,036. In accordance with another process, as described in U.S. Pat. 2,917,473, the distribution of the carbon dioxide in the plastisol is improved and intensified by subjecting the mix to a beating action. In all of the aforesaid processes, however, there is a limit to which the gas pressure can be raised. This limit is governed by the vapor pressure of the carbon dioxide at the working temperature involved. If the $CO_2$ pressure is increased above this limit, the $CO_2$ liquefies at least in part, but an absolute homogeneity of the gas is essential to uniformity of pore structure in the foamed plastics.

In the process disclosed in German Pat. 1,112,627, a homogeneous gas mixture of carbon dioxide and nitrogen or air is used instead of pure $CO_2$, at 20° C. and 130 atmospheres gauge pressure for the foaming. In German Pat. 1,141,440 there is described an apparatus for the manufacture of foamed plastics by the treatment of plastics containing plasticizers with inert gases under pressure. This process is illustrated in the example by the use of mixtures of carbon dioxide and nitrogen and/or of carbon dioxide and air at pressures of 150 atmospheres and at room temperature. In the processes described in German Pats. 1,112,627, and 1,141,440, the use of these gas mixtures in a homogeneous phase is taught. In all of these known procedures, use has been made of the prior art knowledge as hereinafter set out. The J. Physique 9 (1880), 192, and C.R. Acad. Sci. 90 (1880) 210, state that when a mixture of carbon dioxide and air is compressed at a temperature lower than 21° C., the carbon dioxide at first liquefies easily. But when the pressure is increased much further, as for example, to 150 or 200 atmospheres, the meniscus separating the two phases vanishes, and only a gas phase is present. The homogeneity of the gas mixture is caused by the liquid dissolving in the compressed gas. Later studies carried out with carbon dioxide-nitrogen mixtures established that, at 0° C. and above 181 atmospheres gauge pressure, at 10° C. and above 150 atmospheres, and at 25° C. and above 121 atmospheres, only a homogeneous gas phase is present. If, however, the above-noted pressures are lowered, a partial lique-faction of the carbon dioxide occurs in each case. The results of these studies have been published in the Journal of the Chemical Industry (Russian) 16, 2, 37–40, C. (1939) II, 2401, the Journal of Physical Chemistry (U.S.S.R.) 13 (1939), 986–988, C. (1942) I, 319, and C.A. 34 (1940), 46514.

Surprisingly, it has now been found that when the generically known foaming processes are carried out in an apparatus according to German Pat. 1,141,440 using carbon dioxide-nitrogen and carbon dioxide-airmixtures, at pressures of 90 to 110 atmospheres, only one phase is present and no dissociation whatever takes place if these gas mixtures are recirculated with the copolyvinylchloride plastisol during the treatment of the same. With this method and using the stated pressures, very uniform, finely porous foam plastics are obtained.

In accordance with the invention, there is provided a process for the preparation of foam plastics from copolymers of vinylchloride having a K value of 65 to 82, comprising mixing plastisol of a vinylchloride copolymer with a carbon dioxide-air or carbon dioxide-nitrogen mixture under a pressure of 80 to 120 atmospheres, preferably 90 to 110, at a temperature of between 0 and 30° C. and preferably between 10° C. and 25° C., expanding the pressurized plastisol-gas mixture to normal pressure and thereafter setting the thus foamed polyvinylchloride material. The concentration of carbon dioxide in the gas mixture may amount to up to about 80% of the weight of the entire gas mixture.

Figure 2:
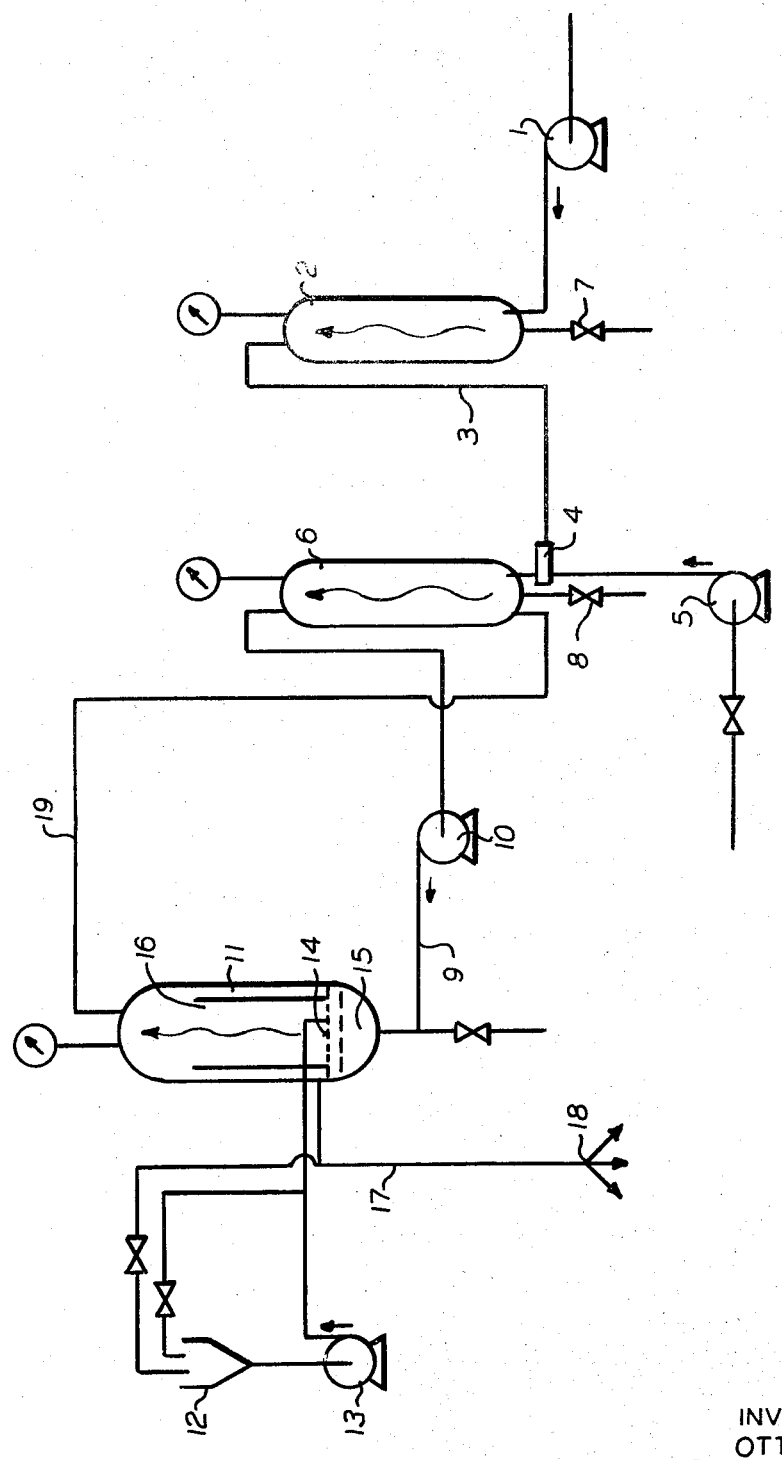

In order to describe the invention in more detail, reference is now made to the accompanying drawing in which:

FIG. 1 is a graphic illustration of the pressure and temperature relationships in the manufacture of polyvinylchloride foams by treatment with gas; and FIG. 2 is a diagrammatic illustration of an apparatus for use in practicing the process of the invention.

Referring to FIG. 1 of the drawing, the curve A–B represents the boundary line between a one-phase and a two-phase state of a mixture of carbon dioxide and air. German Pats. 1,112,627 and 1,141,440 show processes using pressure-temperature relationships which are on or above this line. Curve C–D is the vapor pressure curve for carbon dioxide. The processes of U.S. Pats. 2,763,475, 2,666,036, and 2,917,473 operate at carbon dioxide temperatures and pressures which are below the curve C–D.

It is possible to use higher pressures than those of lines C–D to dissolve the carbon dioxide in the copolymerized chloride plastisol, but the temperature must then be above the critical temperature 31.1° C. It is known that such high temperatures and pressures are unsatisfactory and to be avoided in order to prevent incipient dissolution and/or setting of the vinylchloride copolymer.

Referring to FIG. 2 of the drawing, air or nitrogen is forced by a compressor 1 into a gas tank 2 and fed through a line 3 into a mixer nozzle 4, where the air (or nitrogen) is mixed with liquid carbon dioxide, which is pumped by a metering pump 5 into the mixer nozzle where it is vaporized. The resulting gas mixture is fed into a gas tank 6. Each of the gas tanks is provided with a valve, 7 and 8, respectively, for the removal of the water, and each has a pressure gauge. The gas mixture is driven by a gas circulating pump 10 through a line 9 into the bottom of a vessel 11 in which the polyvinylchloride plastisol is saturated with the gas. This apparatus is substantially similar to the apparatus shown in German Pat. 1,141,440, where it has been described in detail. (See FIGS. 1 and 2 of the patent.) A plastisol pump 13 pumps plastisol from a tank 12 into a distributor tube 14 which is perforated on its bottom side (sparger). The plastisol passes downwardly through the fine holes in the tube, and under the conditions of temperature and pressure of the invention, it comes into intimate contact with the gas mixture passing upwardly through a sieve-plate 15. The gas substantially dissolves in the plastisol which, thus saturated, rises upwardly together with the excess gas mixture while absorbing more gas. The mixed saturated plastisol/gas passes over the edge of an overflow weir 16 and is carried out through a line 17 to an expander 18, where it is foamed. The excess gas mixture is pumped back into the gas tank 6 through a return line 19 for reuse in the process. This recycling of the gas mixture is an essential feature of the invention.

When new or freshly cleaned installations for conducting the foaming operation are put into operation, it is advantageous to at first recirculate the gas mixture at pressures above those at which homogeneous carbon dioxide-air or carbon dioxide-nitrogen mixtures are present, and thereafter to reduce the pressure to the values set forth above falling within the area between curve A–B and curve C–D. When the pressure is thus reduced, no separation of carbon dioxide in liquid form will thereby take place.

Copolymers of vinylchloride used in this invention employ about 5 to 15 weight percent of at least one comonomer which may be vinyl acetate, vinylidene chloride, acrylonitrile, maleic acid esters, fumaric acid esters, and the like. It is preferred to use copolymers formed by emulsion polymerization having particle sizes of about 1 to 2 microns which have been freed from the emulsion system by spray drying. The copolymer has a high K value of 65 to 82, preferably 78 to 80. The K value is a measure of the molecular weight and is measured, for example, by the technique set forth in Cellulosechemie 13 (1932), 60 or by DIN 53726.

The plastisols used in this invention preferably use as a plasticizer alkylphthalates, alkyl adipates, alkyl sebacates, alkyl and/or aryl phosphates, alkyl aryl sulfonates, etc. Solvents are not used in these plastisols. The ratio of copolymer to plasticizer is 5:5 to 5:3, that is, the plastisol contains about 37 to 50 weight percent plasticizer.

The gas mixtures of this invention contain about 50 to 75 volume percent, preferably 65 to 70 volume percent $CO_2$.

The process according to the invention is a significant advance over the prior art processes because while the operating pressures required are not as high as in the high pressure processes of the prior art, sufficient gas is saturated into the copolyvinylchloride plastisol to produce a highly desirable foam product. These lower pressures are advantageous in that substantial savings in power are obtained.

The foamed products of this invention have excellent high temperature stability and are particularly useful in producing upholstery fabric for furniture seats, vehicle seats, and decorative trim, filters where open-pored foams are made, and sound conditioning and insulating material. This foam product is valuable because it can be adhered together by high frequency welding.

The following example is illustrative of the practice of this invention.

A copolymer of vinylchloride and 5% vinyl acetate (500 parts by weight) having a K value of 70 was mixed with 400 parts by weight of a plasticizer composition which was itself a mixture of 225 parts by weight of technical grade alkyl phenyl sulfonate having an average of 10 to 18 carbon atoms in the alkyl portion and 175 parts by weight of 2-ethyl hexyl phthalate and 5 parts by weight of a stabilizer composition which was itself tribasic lead sulfate in dioctyl phthalate. This mixture was passed through a sieve and then saturated with a gas which was a mixture of 74 to 76% $CO_2$ and air. The throughput of plastisol was 58 liters per hour. The pressure within the apparatus was maintained at about 90 to 95 atm. for about 4 days. The gas was absorbed in the liquid plastisol at such a rate that about 4 kg. of $CO_2$ were used up per hour. No liquid $CO_2$ deposits formed. The saturated plastisol was foamed by pressure release and expansion to form a foam product having a bulk density of 0.09 to 0.10 gm./1 cc. and had a fine pore structure.

What is claimed is:

1. In the process for foaming vinylchloride copolymer plastisols by saturating the plastisol with a carbon dioxide containing gas under pressure and then releasing the pressure, the improvement which comprises saturating the copolymer plastisol, at a temperature of about 0 and 30° C. and a pressure of about 80 to 120 atmospheres, with such quantity of gas which is in excess of that which will saturate said plastisol, which gas is a mixture of carbon dioxide and a member selected from the group consisting of air and nitrogen, setting the foam material formed by said expansion and recycling gas remaining after saturating said plastisol.

2. The improved process according to claim 1 which comprises introducing the carbon dioxide-air or carbon dioxide-nitrogen mixture into said polyvinylchloride plastisol at a temperature of between 10 and 25° C. and a pressure of 90 to 110 atmospheres.

3. The improved process claimed in claim 1, wherein said copolymer has a K value of 65 to 82.

4. The improved process claimed in claim 1, wherein said copolymer has 5 to 15 weight percent of at least one comonomer selected from the group consisting of vinyl acetate, vinylidene chloride, acrylonitrile, lower alkyl maleates, and lower alkyl fumarates.

5. The improved process claimed in claim 1, wherein said gas contains 50 to 75 volume percent carbon dioxide.

6. The improved process claimed in claim 1, wherein said gas contains 65 to 70 volume percent of carbon dioxide.

References Cited

FOREIGN PATENTS 1,112,627    8/1961    Germany _____ 260—2.5 R

SAMUEL H. BLECH, Primary Examiner

W. J. BRIGGS, Sr., Assistant Examiner

U.S. Cl. X.R.

260—30.6 R, 30.8 R, 31.8 R, 78.5 CL, 87.1, 87.7, 92.8 A